(12) United States Patent  
Korger et al.

(10) Patent No.: US 9,407,581 B2
(45) Date of Patent: Aug. 2, 2016

(54) DISTRIBUTED PROCESSING OF DATA FRAMES BY MULTIPLE ADAPTERS USING TIME STAMPING AND A CENTRAL CONTROLLER

(75) Inventors: Peter Korger, Lynge (DK); Peter Ekner, Hillrød (DK)

(73) Assignee: Napatech A/S, Søborg (DK)

( * ) Notice: Subject to any disclaimer, the term of this patent is extended or adjusted under 35 U.S.C. 154(b) by 1013 days.

(21) Appl. No.: 13/513,520

(22) PCT Filed: Dec. 6, 2010

(86) PCT No.: PCT/EP2010/068959
§ 371 (c)(1),
(2), (4) Date: Sep. 6, 2012

(87) PCT Pub. No.: WO2011/067405
PCT Pub. Date: Jun. 9, 2011

(65) Prior Publication Data
US 2012/0327949 A1 Dec. 27, 2012

Related U.S. Application Data

(60) Provisional application No. 61/266,781, filed on Dec. 4, 2009.

(51) Int. Cl.
*H04L 12/56* (2006.01)
*H04L 1/00* (2006.01)
*H04L 7/00* (2006.01)
*G06F 1/12* (2006.01)
(Continued)

(52) U.S. Cl.
CPC .......... *H04L 49/9047* (2013.01); *H04L 49/901* (2013.01)

(58) Field of Classification Search
CPC ..... H04L 47/568; H04L 49/90; H04L 47/562; H04L 49/901
USPC ................................................ 370/412, 395.4
See application file for complete search history.

(56) References Cited

U.S. PATENT DOCUMENTS 6,144,662 A * 11/2000 Colmant ............. H04L 12/5601 370/390
7,284,111 B1 * 10/2007 Sae-Koe ............. H04L 12/5693 370/254

(Continued)

FOREIGN PATENT DOCUMENTS

| WO | 2007011130 A1 | 1/2007 | |
|---|---|---|---|
| WO | WO 2007011130 A1 * | 1/2007 | ................. H04L 7/00 |
| WO | 2009093299 A1 | 7/2009 | |

OTHER PUBLICATIONS

Patent Cooperation Treaty, "International Search Report and Written Opinion" by Authorized Officer P. Jimenez Hermandez, from the European Patent Office; mailed Apr. 15, 2011 in PCT/EP2010/068959; pp. 1-12.

*Primary Examiner* — Asad Nawaz
*Assistant Examiner* — Jason Harley
(74) *Attorney, Agent, or Firm* — McHale & Slavin, P.A.

(57) ABSTRACT

An apparatus and a method where a plurality of physically separate data receiving/analyzing elements receive data packets and time stamp these. A controlling unit determines a storing address for each data packet based on at least the time stamp, where the controlling unit does not perform the determination of the address until a predetermined time delay has elapsed after the time of receipt.

20 Claims, 4 Drawing Sheets

(51) Int. Cl.
*H04L 12/861* (2013.01)
*H04L 12/879* (2013.01)

(56) References Cited

U.S. PATENT DOCUMENTS

| | | | |
|---|---|---|---|
| 2003/0039245 A1* | 2/2003 | Khosravi | H04L 45/583 370/389 |
| 2006/0039393 A1* | 2/2006 | Firoiu | H04L 12/5693 370/412 |
| 2006/0067325 A1 | 3/2006 | Kounavis | |
| 2006/0072578 A1 | 4/2006 | Alfano | |
| 2006/0268939 A1* | 11/2006 | Dries | H04J 3/247 370/498 |
| 2007/0237146 A1* | 10/2007 | Hadzic | H04L 49/3063 370/392 |
| 2008/0282006 A1* | 11/2008 | Vivenzio et al. | 710/107 |
| 2009/0172212 A1* | 7/2009 | Stanton | G06F 13/122 710/18 |
| 2010/0281190 A1 | 11/2010 | Namihira | |

\* cited by examiner

DISTRIBUTED PROCESSING OF DATA FRAMES BY MULTIPLE ADAPTERS USING TIME STAMPING AND A CENTRAL CONTROLLER

CROSS-REFERENCE TO RELATED APPLICATIONS

This application is a §371 national stage entry of International Application No. PCT/EP2010/068959, filed Dec. 6, 2010, which claims priority to U.S. Provisional Patent Application No. 61/266,781 filed Dec. 4, 2009, the entire contents of which are incorporated herein by reference.

The present invention relates to an apparatus facilitating parallel receipt of a number of data packets while ensuring a centralized address generation there for.

In a first aspect, the invention relates to an apparatus for receiving and forwarding data packets, the apparatus comprising a controlling unit and a plurality of physically separate data receiving and forwarding elements each comprising:
  means for receiving or accessing a data packet,
  means for determining a point in time of receipt/access of the data packet, the determining means comprising clock means, the clock means of all determining means being synchronized,
  means for outputting first information comprising the point in time, means for receiving an address for storing at least part of the data packet, and
  means for facilitating storage of the at least part of the data packet at the address,
the controlling unit comprising:
  means for receiving the first information and deriving the point in time of receipt/access of the data packet,
  a clock synchronized with the clock means of the determining means, and
  means for, for each piece of first information received, and at a point in time at or after the derived point in time added a predetermined time delay, determining an address and returning the address to the receiving means of the pertaining data receiving and forwarding element.

In the present context, the apparatus is formed by a number of separate elements, such as the controlling unit separate from the receiving/forwarding elements, but interconnected so as to exchange data. This exchange may be under any data transfer protocol, such as TCP, Ethernet, Bluetooth or the like, and using any type of data transfer, wired or wireless.

Also, the receiving/forwarding elements are provided as physically separate pieces of hardware, such as each being embodied by a separate PCB, processor, FPGA or the like. In this respect, physically separate means that the elements are interconnectable so as to be able to communicate (over wires or wirelessly) but where the connection is breakable and a receiving/forwarding element may be replaced or added/removed to alter the capabilities of the apparatus. Naturally, one PCB/processor/FPGA may form a plurality of the receiving/forwarding elements, where such a group of receiving/forwarding elements may then be replaced/removed/added. The controlling unit may be separate from the receiving/forwarding elements or may form part of one or more thereof.

Naturally, the individual means of the receiving/forwarding elements may be obtained or shaped as individual elements, such as processors, software controlled or hardwired, FPGAs, special purpose circuits, ASICS or the like. Alternatively, multiple such means may be combined into a single such processor or the like.

Naturally, any number of receiving/forwarding elements may be used. When a plurality of receiving/forwarding elements are used, parallel reception and storing may be performed. Any number of receiving/forwarding elements may be used, such as 2, 3, 4, 5, 6, 7, 8, 10, 15, 20 or more. All these receiving/forwarding elements may, as is described further below, be identical or nearly identical, or they may be instantiated or created as different circuits with different operations. Each receiving/forwarding element may have a controlling unit, but only one is required. In another situation, only one receiving/forwarding element comprises the controlling unit but is otherwise identical to the remaining receiving/forwarding element.

The accessing/receiving means may actually receive and/or store the data or data packet. Alternatively, the data packet may be received or stored at another position or in an apparatus with which the receiving/forwarding element communicates, whereby the data of the data packet is accessed remotely by reading the data while being stored in the other apparatus. The latter will usually provide a slower processing, as the data packet is accessed remotely.

Even though it is less preferred, the address received may not be the actual address in the storing unit at which the data packet is to be stored. Alternatively, information may be received from which this address may be derived.

The determining means of the receiving and forwarding elements each comprise clock means, the clock means of all determining means being synchronized. In this respect, "synchronized" will mean that all clock means will, within a predetermined tolerance, simultaneously output identical points in time. Thus, points in time of different clock means may be comparable. This synchronization may be ensured by exchanging clocking signals between the clock means and/or the controlling unit. In this respect, the "tolerance" may be within 1, 2, 3, 5, 10 or more clock cycles or timing units as defined by the clocking means.

In one embodiment, a global clock may simply be output to all determining means, where the clock means then receives this clock. Alternatively, the determining means each comprise means for generating a clocking signal. Thus, a strategy for synchronizing this clocking signal is then used.

In general, the point in time may be represented as a time and date or may be represented as a number, such as a number incremented/decremented at equidistant points in time. Naturally, this number may be wrapped around if desired.

The facilitating means may store the at least part of the data packet directly in e.g. a storing unit, such as over a data connection or it may facilitate storing of the data packet if stored at another location. Then, the address may be transferred to this other location, which then handles the storing of the data packet.

Naturally, the receiving/accessing means, the forwarding means and the facilitating means may comprise drivers, connectors etc. required to handle this operation and communicate the data as required.

The controlling unit may be formed by any type of processor, hardwired or software controlled, or may be a special purpose circuit. The operation of the controlling unit is to determine the address for the individual data packets. In this manner, e.g. an ordering of the data packets may be obtained if desired.

The address is determined from at least the point in time, and the purpose thereof may be to have the data packets, or the parts thereof, stored in an order of receipt. In another situation, the first information comprises additional information relating to the data packet, see further below, so as to determine a stream/type or the like of a data packet. Thus, not only the point in time may be used for determining the address, but data packets of certain streams or types may be stored together.

The actual determination of the address will, however, not be performed until a predetermined time delay after the point in time of receipt/access in order to ensure or at least increase the probability that no later received first information relates to data packets actually received earlier than the pertaining data packet. Thus, more knowledge has been gathered so that the probability of providing the correct address is increased.

Thus, the controlling unit also has a clocking means being either a receiver of a global clock signal or a local clocking signal provider. Naturally, some of the controller unit and the receiving and forwarding elements may receive a global clock and others may have local clocking signal providers which are then synchronized to the global clock.

A reason for the first information relating to an earlier received data packet not arriving at the controlling unit at a later point in time may be processing delays (busy data receiving and forwarding element) or delays in the communication between this data receiving and forwarding element and the controlling unit. This predetermined delay may be any number of clock periods, such as 1, 2, 3, 4, 5, 6, 7, 8, 19, 15, 29, 39, 40 or more clock periods, or any period of time, such as 100 ns, 200 ns, 300 ns, 500 ns, 750 ns, 1 ms, 5 ms, 10 ms or more.

The controlling unit will, for each piece of first information and thus each data packet, return an address.

In this respect, a data packet may be any type of a data unit to be transmitted on or transported by a network, data cable, data bus, trunk, or the like. Normally, a data unit conforms to one or more data standards, such as the Ethernet standard being an umbrella under which a number of different standards or data packet types exist, such as UDP and TCP data packets. A data packet usually has a number of different information items or types, such as address data, payload or the like, which are each positioned at well defined or known positions within the data packet. Such positions and types will typically differ from data packet type to data packet type, but usually, the data packet type, and thus the positions of individual contents thereof, may be determined from the actual data packet, where after the individual data items, such as address data and/or payload, may be derived, altered, and/or used in the analysis. The type or standard may be derived directly from the data packet, such as when a particular data item of the packet identifies the type/standard, or may be derived from data derived from the data packet, such as on the basis of recognition of types and positions of data items of the data packet and subsequently determination of type(s) or standard(s) of data packet in which such data may be found at such position(s).

Any part of a data packet may be stored. If the data packet is not desired output again, addressing information therein, e.g., may be deleted in order to not take up space.

Data packets may be ordered and, if so, in a multiple of manners and for a number of reasons. Usually, data exchange between computers is a file transfer, TCP transfer, VoIP or the like, where the order of the individual packets is important. Usually, such transfers are called streams.

A stream of data packets normally is a sequence of data packets transmitted from a single transmitter to one or more receivers. These data packets relate to e.g. a single file or the like transmitted in smaller portions, being the payload of the packets. The transmitter and receiver, or any intermediate network elements, will usually then have addresses also represented in the packet. In addition, other stream identifying information may be present in the data packet, depending on the individual data packet standard.

Thus, a stream may be identified on the basis of e.g. the addresses and/or the stream identifying information, whereby, if used consistently, the same information may be derived, and any subsequent process may identify the stream merely from the information. Then, the packets of each stream may be stored in separate queues.

In another situation, data packets may be provided with information therein determining the order thereof, such as a sequence number. Thus, this information may be used for ordering the packets.

A second aspect of the invention relates to an assembly comprising an apparatus according to the first aspect and a storage comprising a plurality of addresses at which data may be stored, the facilitating means being adapted to store the at least part of the data packet at the received address in the storage.

Naturally, the storing unit may be any form of storing unit, such as a monolithic storing unit or one composed by a number of storing elements separated in space. Usual storing technologies are based on hard drives, floppy discs, RAM, ROM, PROM, EPROM, EEPROM, Flash, memory cards, CD-ROM, DVD, memory cards, or the like.

If separate storing units are provided, the address will describe both the identity of the actual storing unit and the "local address" therein.

Data packets may have different sizes and may then take up a different number of addresses.

Preferably, a plurality of queues are defined in the storage as separate or non-overlapping groups of addresses, the determining means of the controlling unit being adapted to determine, from the first information, a queue to which to add the pertaining data packet, and to select an address from the groups of addresses of the pertaining queue.

In this respect, the groups of addresses are non-overlapping when no address is a part of two groups or two queues.

Preferably, a queue comprises a plurality of sequential addresses, but this is not a requirement.

Preferably, the determining means of the controlling unit is adapted to determine an address in the determined queue so that the data packets are stored in the queue in an order of receipt/access. Thus, the predetermined time delay serves to ensure (or at least increase the probability of) that the data packets are stored in the order of receipt/access independently of any delays otherwise occurring.

A particularly interesting embodiment is one further comprising means for reading or de-queuing data from the storage, the reading/de-queuing means comprising means for outputting second information relating to one or more address (es) of the storing means, the data of which has been, or will be, read/de-queued. Thus, when an address is determined, the addition of data to a queue takes place, and when reading/de-queuing, data is removed. On the basis of this information, the contents of the queue(s) may be determined and updated.

In one embodiment, the controlling unit is adapted to hold, for each queue, a write pointer identifying a next address in which to add data, or a last address to which data was added, and a read pointer identifying a next address to be read/de-queued from the queue, or the last address read/de-queued, the controlling means being adapted to:
    update the write pointer of the queue to which the determined address relates, when an address is determined,
    update, on the basis of received second information, the read pointer of the queue from which data has been de-queued, such as from the above second information, and
    determine the address also on the basis of the read and write pointers of the queues.

In one situation, the determination of the address also on the basis of the read/write pointers may be made on the basis of a determination of a fill level of the queue(s). Clearly, the amount of data of a queue may be determined from the read and write pointers thereof. In the present context, the fill level may relate to a number of data packets present in a queue or a number of addressable elements taken up by the queue. This fill level may be represented as an amount/number of data/packets/addresses or as a percentage, when this number/amount is compared to a maximum number/amount. The fill level may be determined for each queue, a group of queues or for all queues.

In a preferred embodiment, the controlling means is adapted to, when a fill level of a queue exceeds a predetermined value, instruct the outputting means of the reading/de-queuing means to output the second information relating to the addresses at which data has been, or will be, read.

In this situation, it is desired to know the size of the, at least part of, data packet when determining an address, as this size will determine the number of addressable elements taken up thereby. The address for the next data packet will, thus, depend thereon.

When updating a read pointer, it may be desired that the second information identifies the addresses of all freed addressable elements or merely identify an address at the boundary between the next data packet to be read or the newly freed addresses. This address may be the first address of the next data packet or the last of the freed addresses.

In this situation, the second information and thus, the read pointers is not output too often. This data transfer may take up bandwidth on the data path via which the data is stored in the storing means.

During storing, the write pointers is updated by the controlling unit, and the queue(s) thus seem to grow, when the read pointers are not updated. Naturally, the write pointers may often be forwarded to the reading/de-queuing means in order to ensure that these do not become idle, which would be the situation if their, updated, read pointers and not-updated write pointers together indicate that queues are empty. Thus, the controlling means may be adapted to output to the reading/de-queuing means, information relating to updated write pointers, when an address is determined. Thus, the reading/de-queuing means may be fully updated.

Most preferred is it when the facilitating means are adapted to inform the controlling unit when the at least part of the data packet has been stored, and wherein the controlling unit is adapted to output to the reading/de-queuing means, information relating to updated write pointers, when having been informed by the facilitating means. Thus, the write pointers are updated only when the data has been stored. Then, it is avoided that the reading/de-queuing means read/de-queue an address with an updated write pointer but not still having received the data.

When the fill level of one or more queues, or all queues or the whole storage, exceeds the limit, the read pointers are updated, so that the actual fill level of the queue(s) is available to the controlling unit.

Preferably, each time a data packet (or part thereof) has been stored, a write pointer is updated and the reading/de-queuing means are informed. However, as the bandwidth between the storing means and the data receiving/forwarding elements preferably is reserved for storing/reading/de-queuing data, it may be desired to not forward updated write pointers each time a data packet has been saved but to pool such information (by updating the local write pointers a number of times before updating the reading/de-queuing means) and e.g. send this update when the bandwidth requirement to/from the storing means allows this. However, it may be determined that an update must be sent before a maximum time limit has elapsed since the last update.

Preferably, the addresses in which the queues are stored are allocated as consecutive addresses. In this manner, the fill level etc. is easily determined by simply subtracting the read and write pointers from each other in order to determine the number of addresses presently occupied in a queue.

However, the providing of a large number of consecutive addresses may be problematic in real life systems. In standard storage systems, blocks or segments are allocated which have a maximum size of e.g. 4 MB. Within a segment/block, the addresses are consecutive, but as the segments/blocks may be randomly allocated in the memory, the full address may not be.

In such situations, the addresses of the queues of the storing unit are grouped into groups of predetermined number of physical addresses, the groups being positioned non-consecutively. In this respect, "non-consecutively" means that the groups are not positioned neighbouring (having consecutive addresses across group boundaries) in the storage space. Then, the addresses implementing the queues preferably are virtual addresses defined as consecutive addresses, the controlling unit further comprising means for converting between virtual addresses and physical addresses.

Thus, any number of consecutive virtual addresses may be allocated, which are then converted to the real, physical addresses.

One manner of obtaining this is one wherein the storing unit has a number of allocatable segments/blocks, each group of physical addresses defining addresses within one of the allocatable blocks/segments, each block/segment being identifiable with an address of a first number of bits, all addresses within a block/segment being addressable using a second number of bits, the physical addresses having a number of bits corresponding to a sum of the first and second numbers of bits, the virtual addresses each comprising a first part, having at least the first number of bits, and a second part having at least the second number of bits, wherein the converting means are adapted to convert the first part of the virtual address into a third part having the first number of bits and identifying an allocated block/segment, and generating the physical address as an address having the third part and the first part.

In a preferred embodiment, the determining means is adapted to select the address by:
for a received/accessed data packet, such as from the first information, determine a second group of queues, each second group of queues comprising one queue from each first group of queues, the queues of the second groups of queues being non-overlapping,
if the fill level of a presently selected first queue of the determined second group exceeds a predetermined level, identifying and selecting a second queue of the determined second group,
selecting the address as an address of the identified, second queue,
the assembly further comprising means for instructing the reading/de-queuing means relating to the identified and selected second queue to not process this queue, until the first queue with the exceeded predetermined level is empty.

In this embodiment, load balancing between the processes/processors may be obtained while maintaining an ordering in the processing/de-queuing of packets within any second group.

Especially when an ordering of the stored (at least part of) data packets is important when de-queuing and/or analyzing/processing these, it is difficult to allocate such data packets to another reading/de-queuing means, once a reading/de-queuing means has begun de-queuing/processing these. With the present embodiment, each such group of data packets, usually a stream, is allocated to a second group of queues, each second group of queues having separate queues de-queued/processed by separate ones of the reading/de-queuing means. Thus, if the queue in which the data packets are presently stored, and which is de-queued by first reading/de-queuing means, gets too long, i.e. the first reading/de-queuing means is too busy, it is decided to identify another queue, de-queued by a second reading/de-queuing means, from the same second group, but to not allow the second reading/de-queuing means to de-queue data packets, before the first reading/de-queuing means has de-queued all data packets from its queue in the pertaining second group. In this manner, the ordering of de-queuing of the data packets is maintained across reading/de-queuing means.

In a third aspect, the invention relates to a method of operating the apparatus according to the first aspect, the method comprising:
initially, synchronizing the clock means of all determining means,
subsequently:
each data receiving and forwarding element:
  receiving or accessing a data packet,
  determining a point in time of receipt/access of the data packet, the determining step comprising receiving the time of receipt from the clock means of the data receiving and forwarding element,
  outputting first information comprising the point in time,
  receiving an address for storing at least part of the data packet, and
  facilitating storage of the at least part of the data packet at the address, and
the controlling unit:
  receiving the first information and deriving the time of receipt/access of the data packet and
for each piece of first information received and at a point in time at or after the point in time of receipt/access added a predetermined time delay, determining an address and returning the address to the receiving means of the pertaining data receiving and forwarding element.

As mentioned above, the accessing of the data packet may not require a receipt thereof in the apparatus but may be an access of the data packet when received and/or stored at a remote element with which the apparatus communicates.

This synchronizing step may be any desired synchronization. A global clock can be distributed and/or the reading/forwarding elements have separate clocks, where the synchronization may be the synchronizing of all other clocks to the clock of one reading/forwarding element, a clocking signal of the controlling unit, or the global clock.

In one embodiment, the facilitating step comprises storing the at least part of the data packet at the received address in a storage comprising a plurality of addresses at which data may be stored. This storing preferably is handled as a DMA communication.

Then, a plurality of queues may be defined in the storage as separate or non-overlapping groups of addresses, the determining step comprising determining, from the first information, a queue to which to add the pertaining data packet, and selecting an address from the groups of addresses of the pertaining queue.

Preferably, the step of determining the address comprises determining an address so that, within one or more of the queues, the at least part of the data packets are stored in the order of receipt/access thereof.

In one situation, the method further comprises the step of reading or de-queuing data from the storage, the reading step comprising outputting second information relating to one or more address(es) of the storing means, the data of which has been, or will be, read/de-queued.

In a preferred embodiment, the controlling unit holds, for each queue, a write pointer identifying a next address in which to add data, or a last address to which data was added, and a read pointer identifying a next address to be read/de-queued from the queue, or a last address read/de-queued,
the controlling means:
  updating the write pointer of the queue to which the determined address relates, when an address is determined,
  updating, on the basis of received second information, the read pointer of the queue from which data has been de-queued, such as from the above second information, and
  determining the address also on the basis of the read and write pointers of the queues.

As mentioned above, this determination may be performed also on the basis of a fill level of the queue(s).

In one situation, the controlling means instructs, when a fill level of a queue exceeds a predetermined value, reading/de-queuing means to output the second information relating to the addresses at which data has been, or will be, read.

Then, the determining step could comprise outputting to the reading/de-queuing means, information relating to updated write pointers.

In one situation, determining step comprises outputting to the reading/de-queuing means, information relating to updated write pointers when an address has been determined. Preferably, however, the facilitating step comprises informing the controlling unit when the at least part of the data packet has been stored, and wherein the controlling unit outputs to the reading/de-queuing means, information relating to updated write pointers, when having been informed by the facilitating means. Thus, the write pointers are not updated until the data has been stored in the determined address(es).

In one embodiment, the addresses of the queues of the storage are grouped into groups of predetermined number of physical addresses, the groups being positioned non-consecutively, and wherein the addresses implementing the queues are virtual addresses defined as consecutive addresses, the determining step further comprising converting between virtual addresses and physical addresses.

In the following, preferred embodiments of the invention will be described with reference to the drawing, wherein.

Figure 1:
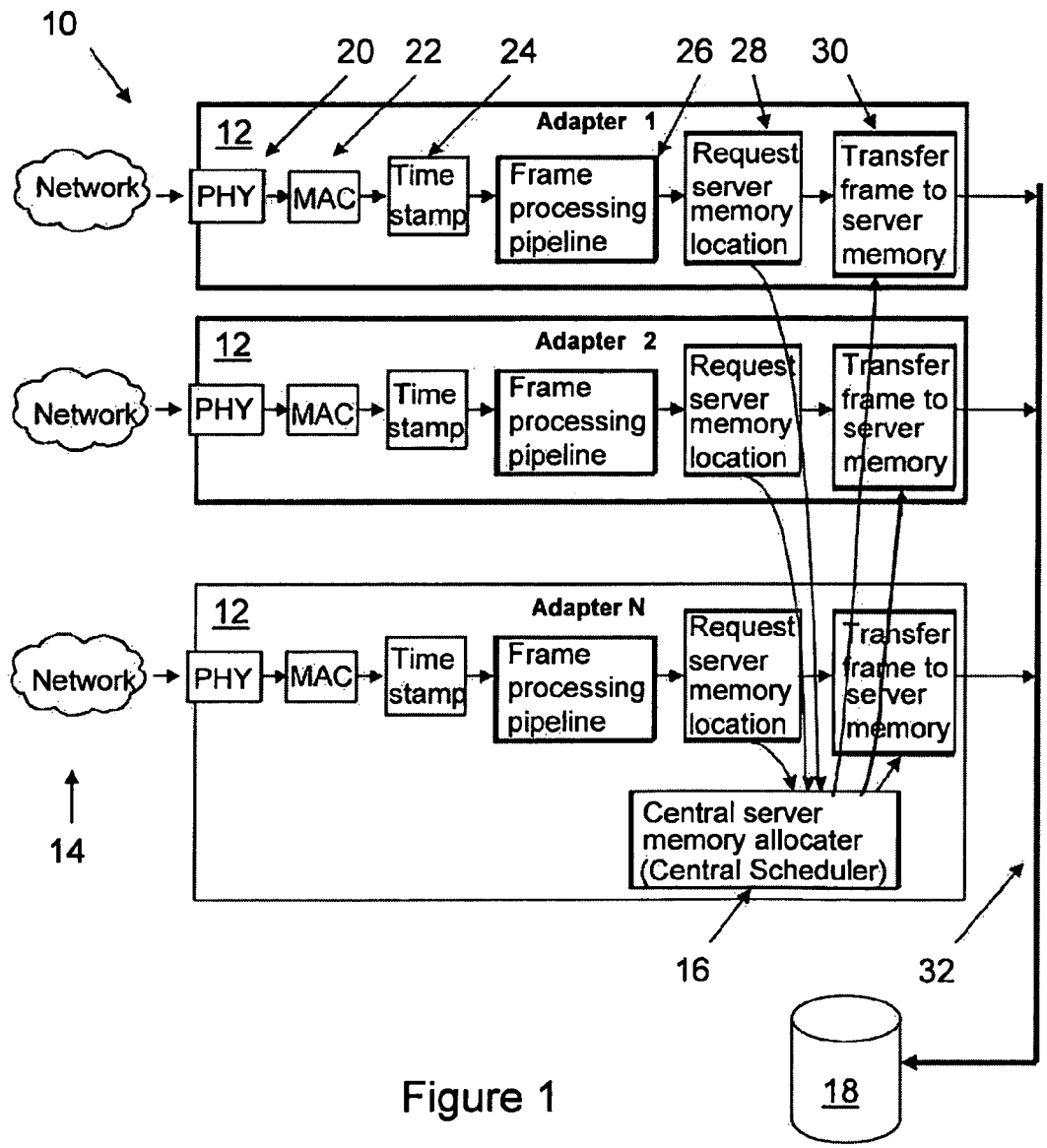
FIG. 1 illustrates an apparatus and an assembly according to the invention.

In FIG. 1, an embodiment 10 of an apparatus for analyzing and forwarding data frames is illustrated having a number of adapters 12 each connected to and receiving data from a network, such as the WWW.

In general, a system of this type may be used for receiving a large number of data packets and facilitate storage and/or forwarding thereof in a suitable manner. These data packets usually are transmitted between pairs of computers or networks on a data connection monitored by the present system.

Thus, the data packets normally are not meant for nor addressed to or from the present system.

This data may, when stored, be processed by one or more subsequent processes or processors (not illustrated). In order to be able to handle very large amounts of data, structured storing is desired in order to achieve swift, yet structured, retrieval of the data. Also, a plurality of processors is provided when a single processor does not suffice, whereby separate storing of data for each processor is desired.

The processors may be used for analyzing the data traffic, for storing the data and/or for transmitting the data to other network elements, computers or the like, depending on the result of the processing in the processors.

Alternatively, or additionally, it may be desired to subsequently output the data again, whereby it may also or alternatively be desired to store the data in a manner or sequence in which the outputting is desired.

Normally, the data packets are parts of streams of data packets. When two processors or computers interact, a stream of data packets is exchanged. This stream may be a file transfer or an exchange of audio/video, such as Voice over IP. A stream is a sequence of data packets which are similar, and the belonging of a data packet to a stream is determinable, and it is desired that all data packets of a stream are stored together, in the desired order, handled by the same subsequent process or processor and/or output in that order.

The belonging of a received data frame to a stream is determined from an analysis of the frame. This analysis is described in further detail below.

The present embodiment aims at providing a set-up in which multiple adapters 12 divide the task of analyzing the frames/packages and/or storing these.

More particularly, the adapters 12 receive data frames from the network 14, such as the WWW, a trunk or network of any suitable type. Each adapter 12 receives a number of frames independently of the other adapters 12.

Preferably, all adapters, potentially except one, are identical and each comprises a so-called PHY 20, which is an element adapted to receive data frames from a network or data cable and a so-called MAC circuit 22 which converts the received frames to a standard usually used on data busses on e.g. computers.

Having received the data frame, it is provided with a time stamp in the circuit 24, where after the frame is fed to an analyzing circuit 26 which derives data relating to the data frame, such as relating to a standard the frame conforms to, such as whether it is VLAN and/or MPLS tagged, and potentially address data therefrom. A plurality of different types of standards are known, each of which defines which types of data (address, encapsulation, payload, error correction etc) are present in the frame and where such data is present. Depending on the particular type of packet, different types of data may be derived.

The circuit 26 outputs data identifying the data frame, such as its belonging to a data packet stream, or a queue in a central storage. Then, the length of the data frame, the ID/queue identification and the time stamp of the data frame are transmitted, in a request circuit 28, to a central server memory allocator or controller 16, which returns an address within the storage 18 in which the data frame is to be stored. This address is returned to a transfer circuit 30 also receiving the data frame and which subsequently transmits the data frame to the identified address via a common data bus 32, such as running a PCI Express (PCIe) protocol. This storing may be using Direct Memory Addressing, which means that the frame is stored directly at the desired address, and that no further analysis is required. This is the fastest manner of storing data in a data storage, but it requires that the physical address is known.

Naturally, the circuit 28 may alternatively output, together with the time stamp and length of the packet, other information identifying the frame (type, addresses or the like), whereby the allocator itself will determine the queue to which the frame is to be added and thus derive the address at which the frame is to be stored.

The "out of band" communication between the allocator 16 and the adapters 12 may be a low bandwidth point-to-point communication, a daisy chain topology, or a ring topology. This communication, as is described further below, is also used for synchronizing the clocks of the time stamp circuits 24. A suitable protocol for this communication may be a standard 64b/66b codec requiring approximately 1 Gbps full duplex bandwidth per 10 Gbps of Ethernet front port (PHY) bandwidth.

It is noted that the above embodiment 10 may store the data frames in any number of queues in the storage 18. Which queue to forward a data packet to may depend on the future destiny of the frame. If the frame is to be analyzed by one or more processors, one queue may be provided for each processor, and the forwarding of frames to a queue may depend on how long the queue is before adding the packet. If the queue is long, and the processor thus busy, the packet may be provided in a shorter queue of a processor thus less busy.

In the present manner, it is ensured that the at least part of the data packets are stored in the queues in the same order as they were received/accessed. If a first data packet was received after a second data packet, the ordering thereof would be restored due to the delayed processing of the controlling unit, whereby the two data packets are not processed until both are known to the controlling unit and the addresses allocated thus are of the correct order.

It is noted that if most data frames relate to streams, it may not be desired to transmit frames relating to the same stream to different queues for analysis by different processors. In this manner, any load balancing between processors is preferably carried out by allocating all future frames from a newly started stream to a "starving" processor. An alternative to this is described further below, as is this load balancing.

Also, if the frame is at a later point in time to be output from the storage 18, the frames to be output may be provided in a particular queue and in an order in which the frames are to be output. Such outputting is described further below.

If a given quality of service is desired, any queue may be split up into a number of queues of different priorities, so that higher priority frames may overtake lower priority frames and then be handled (processed, output, analyzed or the like) swifter.

Load Balancing within an Adapter 12

Figure 6:
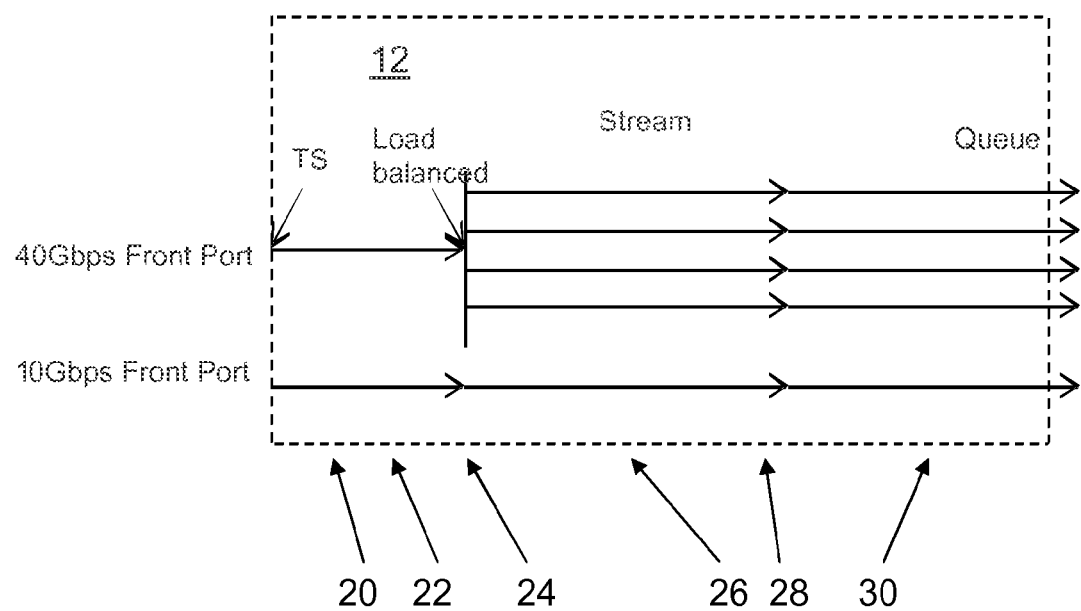
FIG. 6 illustrates load balancing within an adapter.

In FIG. 6, it is seen that part of the elements, such as the PHY 20, MAC 22 and Time Stamp allocation 24 of an adapter 12 may be working at a higher speed than that of the other elements, such as the analyzer 26, the requester 28 and the transfer circuit 30. In this situation, multiple "instantiations" of these slower elements may be made in order to divide the data packet flow received and time stamped from the elements 20-24 into multiple parallel flows. In FIG. 6, the data packets received on a single PHY 20 are divided into four parallel flows. The elements 20-30 are not directly illustrated, but their positions in the flow are.

Naturally, load balancing between the individual flows may be carried out if desired.

The lower line in FIG. 6 illustrates the alternative, where a high speed PHY 20 receives data packets which are handled in a single flow in the adapter 12.

Load Balancing of External Processes or Processors Using Multiple Queues

Load balancing of processors or processes (not illustrated) reading data from the queues of the storage 18 may be performed in a number of manners. If an ordering (order of receipt or defined by data in the individual data packets) of data packets in a stream or the like is not relevant, a single queue may be provided for each processor. If the queue of one processor runs full (how this may be determined is described further below), the allocator 16 may simply effect that more data packets is transmitted to the other queue(s).

If quality of service is desired, different queues may be used for different priorities.

Figure 5:
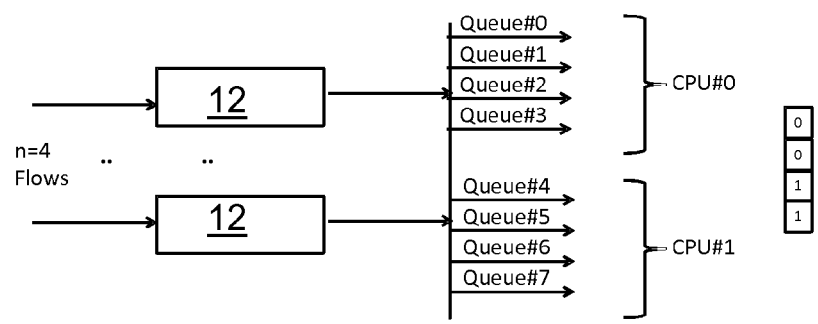
FIG. 5 illustrates load balancing between processors while maintaining order between the data packets.

If an ordering of the data packets of e.g. a stream is desired maintained, a scheme is illustrated in FIG. 5, wherein two adaptors 12 are illustrated receiving a total of 4 flows/streams of data.

The adaptors 12 transmit the data packets to a total of 8 queues (no. #0-#7) stored in the storage 18 for de-queuing by two processors (no. #0 and #1) using the following scheme: queues #0-#3 are handled by processor #0, and queues #4-#7 are handled by processor #1. Also, queues #0 and #4 are generally used for stream #0, queues #1 and #5 are used for stream #1 and so on.

Initially, data packets of stream #0 are transmitted to queue #0, but as this queue grows full, the allocator 16 starts transmitting data packets from stream #0 to queue #4. However, processor #1 is not allowed to de-queue and analyze such packets, until processor #0 has emptied queue #0. In order to control this, four bits are allocated, one for each stream, the value of which determines which processor may handle packets from each queue. In FIG. 5, the top bit controls the access to stream #0, and as its value is "0", this means that processor #0 may handle this queue and thus de-queue packets from queue #0.

It is seen that the two bottom bits are "1" indicating that processor #1 is allowed to handle streams #2 and #3 and thus de-queue from queues #6 and #7. When a processor is allowed to process more than a single queue, it may select the next queue to be processed in any suitable manner, such as round robin, priority, queue length, or the like.

The four bits are controlled by the processors and stored in the storage 18. When more than two processors are used, an ordering or sequence thereof is decided, so that when processor #1 has emptied a queue, either it will alter the corresponding bit(s), or processor #2 will notice that the queue of processor #1 is empty, alter the corresponding bit(s) and then start de-queuing its corresponding queue. The same order is used by the controller to determine to which queue, if one is full, to add the next data.

Then, in order to maintain the ordering of the data in the queues, the allocator 16, if changing a queue, will always select a new queue which is empty.

Naturally, if more than two processors are able to handle a single queue, more bits are used for each flow to indicate which processor is presently allowed to process the flow.

Virtual Address—Physical Address

In order to make the set-up more easily adapted to different systems, it is preferred that the request circuit 28, the transfer circuit 30, the allocator 16 as well as any de-queuing circuitry in or connected to the storage 18 operate in a virtual address space.

Due to the standard requirement that only a given maximum block size may be allocated for DMA, and the fact that such allocated blocks may be positioned at different or random positions in the memory in different systems or from time to time of operating the same apparatus, direct operation using the physical addresses becomes cumbersome. Hence, virtual addresses are preferred.

Presently, an address (see FIG. 2) with a total length of 32 bits is divided into two parts of which one part has a number of bits adapted to address all addresses in a maximum size allocatable block. In the present example, the max size block or segment has a size of 4 MB, requiring 22 bits for addressing. This part of the virtual and physical address is the same and is used for addressing within a single block/segment.

In order to avoid the fact that physical blocks/segments may be positioned at different addresses in the storage 18, the virtual addresses are all, at least for each queue, defined as consecutive addresses, irrespective of the fact that these may be positioned in different blocks/segments. Thus, the 32 bits will be interpreted as a number of consecutive addresses. This may be sub-divided into a number of 4 Mbyte blocks/segments, but virtually positioned consecutively. The virtual address may thus be seen as an initial 10-bit part indicating one of the consecutive virtual blocks/segments and the last 22 bits as an internal addressing within this block/segment.

In the physical reality in the storage 18, the last 22 bits addressing within a segment/block may be maintained, but the first 10-bit part of the virtual address is simply converted into an addressing or identification of one of the physically allocated blocks/segments.

Figure 2:
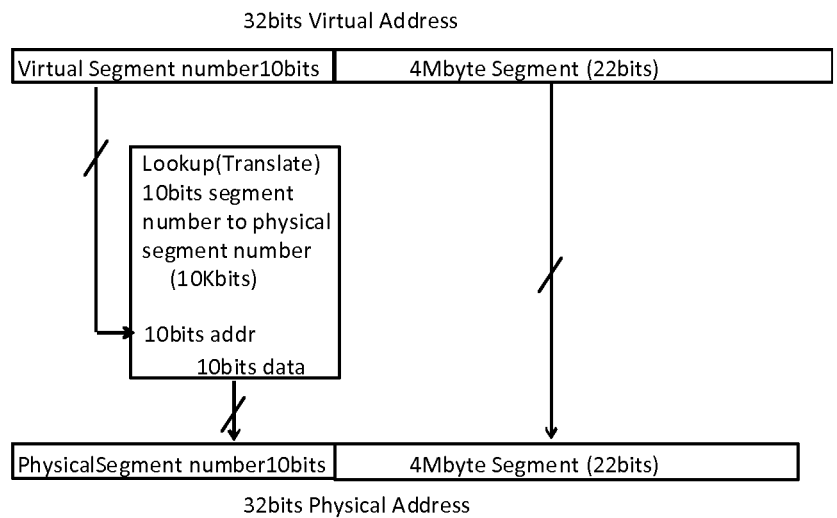
FIG. 2 illustrates conversion from virtual address to physical address.

For this use, a Look Up Table is provided for translating the first 10 bits of the virtual address to an actual identification—i.e. a 10-bit address—of an actually allocated block/segment. This Look-Up Table (LUT) may be set up at initialization of the embodiment. This is illustrated in FIG. 2.

It is noted that also the read/write pointers, which are described below, may be used in the virtual address space, which again makes e.g. determination of a queue length much easier, when the virtual addresses are defined as sequential addresses.

Naturally, as will be seen further below, if a process/processor de-queues a data item from the storage 18, the address and size (or number of addressable elements taken up) thereof may be returned to the allocator 16 as the physical address or the virtual address. In either case, the allocator 16 is able to determine the virtual address and update the pointers accordingly.

Timing—Synchronization of Clock Between the Allocator 16 and the Adapters 12

In order to have reliable and comparable time stamps for the frames received, it is desired to have synchronized clocks in the adapters 12 and the allocator 16.

Figure 3:
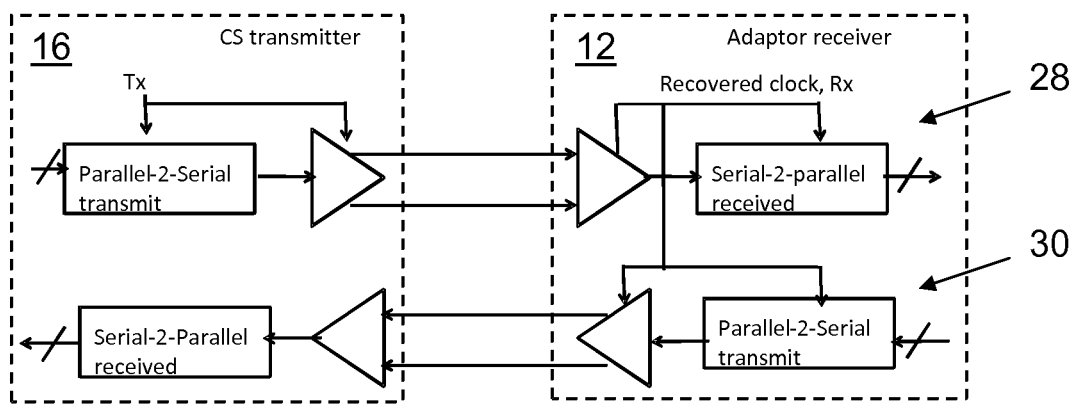
FIG. 3 illustrates synchronization of clocks between the allocator and an adapter of FIG. 1.

Clock phase synchronization is presently obtained by forwarding, with the data transferred from the allocator 16 to the transfer circuits 30, a clock signal which is encoded in the data transferred but recoverable as is usual in the art. The adapters 12 are adapted to derive this clock signal and use it both in the transfer circuit 30 and the request circuit 28, as illustrated in FIG. 3.

Having synchronized the phases, the actual clock time is synchronized in two steps. In step 1, the allocator 16 transmits to each adapter 12 an instruction to transmit a message to the allocator 16 which then determines the overall roundtrip time when receiving the message.

In step 2, the allocator 16 instructs the adapter 12 to adapt its time to the clock time of the allocator 16.

More particularly, step 1 comprises the allocator 16 transmitting an instruction to the individual adapter 12 while logging the local allocator transmission time. The adapter 12, when receiving the instruction, immediately transmits a message to the allocator 16, which logs the time of receipt. The contents of the instruction and message are not important. The allocator 16 now subtracts the transmission time from the time of receipt and derives the roundtrip time. Half this time is assumed to be the time delay of a data transmission between the allocator 16 and the pertaining adapter 12. Naturally, different time delays may exist between the allocator 16 and different adapters 12.

Step 2 is the transmission from the allocator 16 to the adapter 12 of an instruction to set the local adapter time to a value being the present local time of the allocator 16 added the determined time delay. Thus, when the adapter 12 receives this instruction, it will set its local time to the time which the local time at the allocator 16 in the meantime has advanced to. Then, the clock times of the allocator 16 and the adapter 12 are synchronized to within a clock cycle of the clock signal. As the phases or clock pulses are also synchronized, the clocks will remain synchronized.

This recovered clock is then also used for time stamping the data packets received. Thus, all time stamps are synchronized to within a clock cycle.

As a number of instructions may be pending between the allocator 16 and any of the adapters 12, an identifier is provided in each instruction/request. Presently, the identifier is a time stamp between 0 and 7 (3 bits) which is shifted and wrapped around in synchronism with the clock. Thus, the allocator 16, when sending an instruction, will add the time stamp, and the adapter 12, when replying to that instruction, will copy the time stamp into the reply, so that the allocator 16 is able to determine to which instruction the reply relates.

Naturally, the present synchronization of the adapter 12 to the allocator 16 may be performed for any number of adapters 12. The adapters 12 may be connected to the allocator 16 in a star configuration in which all adapters 12 communicate directly with the allocator 16, in a ring topology, or in a daisy chain configuration having the allocator 16 at an end of a string of adapters 12 which then communicate with the allocator through one or more other adapters 12.

Operation of the Allocator 16

For each of the queues of the storage 18, the allocator 16 has two queues (see FIG. 4): a RIFO (Random In First Out) and a FIRO (First In Random Out) queue.

The FIRO queue holds the pending requests from all adapters 12 and relating to the pertaining queue of the storage 18. A Write pointer points to the next free position of the FIRO queue. A request received from an adapter 12 is received and provided in this position.

The RIFO queue holds information relating to when frames for the storage queue are to be output as well as an order thereof. Each entry in the RIFO queue relates to a point in time of the clock, and a read pointer points to the present point in time of the RIFO queue.

When a request is received, the time stamp thereof is derived, and an identifier is provided in the RIFO queue at the corresponding position or point in time. It is noted that this position or point in time may be sooner than other frames for the same storage queue due to the fact that information from some adapters 12 or the processing in such adapters 12 may take longer than from/in others.

Figure 4:
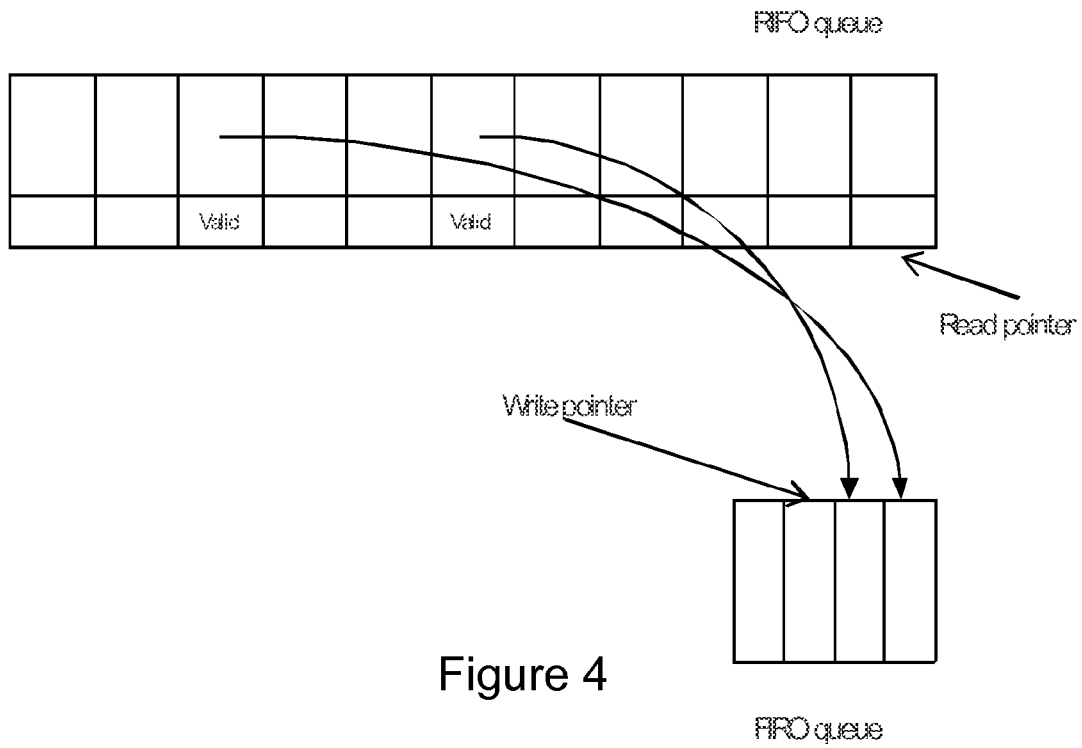
FIG. 4 illustrates a manner of ordering randomly received packets in a time sequence.

In FIG. 4, it is seen that the first frame in the FIRO queue has a later transmission time that the next frame.

The Read pointer of the RIFO queue advances once per clock cycle, and if an identifier is seen at the new position of the Read pointer, the corresponding position of the FIRO queue is addressed and a transmission instruction is transmitted to the pertaining adapter 12. Then, the corresponding entry of the FIRO queue is removed (or an end pointer is advanced to this position).

Naturally, the FIRO and RIFO queues may be implemented as circular queues.

In order to take into account any time delays caused by e.g. data transmission between the adapters 12 and the allocator 16 as well as processing times in the adapters 12, the Read pointer relates to a point in time delayed in relation to the actual point in time as defined by the synchronized clocks and which is used for providing the time stamps of the frames (as is also forwarded in the requests stored in the FIRO). In this regard, when the entry is provided at the correct position in the RIFO queue, the time stamp of the relevant request is no longer needed and is discarded in order to not take up space in the tables.

Thus, the time of the Read pointer may be several, such as 3, 4, 5, 6, 7, 8, 9, 10 or more clock cycles behind the real clock. Then, a frame time stamped at e.g. time 120 may be forwarded to the FIRO queue and entered into the RIFO queue at time 120, which is addressed (Read pointer advanced to that position) at time 130.

At all times and for each queue in the storage 18, the allocator 16 has two pointers, a Write pointer identifying the next address at which a next frame from an adapter 12 is to be stored, and a Read pointer identifying the address of the next stored frame of this queue to be de-queued for further analysis, forwarding or the like. When a new frame is to be stored, the Write address is forwarded, i.e. the next virtual address is converted into its physical address which is forwarded, to the pertaining transfer circuit 30, which then facilitates storing of the frame. At the same time, the allocator 16 increases the pertaining Write pointer with a value corresponding to the size of the frame.

Due to the fact that the allocator 16 returns addresses to the adapters 12 which then store the data packets therein at their own pace, the write pointers may not always be updated even though data is stored.

When an adapter 12 has stored a data packet in the storage 18, it will inform the allocator 16 accordingly. However, if packet X is to be stored immediately before (lower address) packet Y, but packet Y is stored more swiftly, the allocator 18 will realize this and thus not update the write pointer, until also data packet X has been stored, as there is now a "hole" in the queue. When data packet X has been stored, the write pointer for that queue may be updated to the first address after data packet Y.

In the situation where one or more of the queues holds frames for further analysis of e.g. a processor, the number of frames in such a queue, or the fill level of the queue, will illustrate how busy this processor is. This is simply determined by the difference in addresses between the Write pointer and the Read pointer of the queue, when virtual addresses are used.

The de-queuing of frames from the storage 18 may be facilitated by any apparatus or process/processor, such as one connected to the storage. De-queuing a frame from the storage 18 causes this apparatus/process/processor to alter the Read pointer of this queue correspondingly.

In general, adding frames to the storage 18 makes the allocator 16 alter the write pointers, and de-queuing frames makes the processes/processors alter the read pointers. Naturally, it is desired that this information is exchanged. Several methods and schemes exist.

In one situation, it is desired to not exchange this data too often in order to preserve bandwidth on the DMA bus for the data packet exchange. In this situation, the mirroring or synchronizing is initiated by the allocator 16. Each time a data packet is written in the storage 18, the allocator 16 may update the write pointer, whereby the (number of data frames or the fill level of) individual queues will seem, to the allocator 16, to grow, as the read pointers are not updated.

Naturally, updated write pointers may be exchanged once in a while, but this is preferred to not update these, until a size of a queue exceeds a predetermined limit. At this point, the allocator 16 will update the read pointers from the storage 18 or the process(es)/processor(s) in order to obtain updated data on the actual sizes of the queues and thus of how busy the process(es)/processor(s) is/are.

In one situation, the process(es)/processor(s) may, at the same time, receive updated write pointers. In this manner, the process(es)/processor(s) may starve, if they empty all queues before information that additional packets have been stored and are ready for analysis/de-queuing. This may be avoided by updating the write pointers at the processes/processors or in the storage 18, when updating them in the allocator 18. Then, the processes/processors have updated queue information and keep operating, as long as data packets are present.

Alternatively, the updating also of the read pointers may be more frequent, in order to keep the allocator 16 and the process(es)/processor(s) better "informed". This synchronization of the Write/Read pointers could be performed when the bus 32 is not busy, or e.g. when a maximum delay has passed since the last synchronization.

Naturally, the queues or storage 18 may be circular, and a particular space may be allocated to a queue if desired.

Naturally, if an adapter 12 back to back receives multiple data frames which relate to the same stream, the request circuit 28 will transmit a number of requests which the allocator 16 then will provide at the relevant positions in the RIFO queue. If the relevant adapter 12 is identified in each entry in the RIFO queue, the allocator 16 may identify multiple, neighbouring entries in the RIFO which relate to the same adapter 12, and thus only revert to this adapters 12 transfer circuit 30 with one transmission identifying not only the queue (address data) but also the number of packets to be forwarded on the basis of this simple request.

Transmission of Data from the Storage 18 Via an Adapter 12

Naturally, data packets stored in one or more queues in the storage 18 may be de-queued, transmitted over the bus 32 and output via an adapter 12. As is the case when storing the data packets stored in the storage 18, this may be performed via DMA, whereby the adapter 12 directly reads the data packets in the storage 18 without intervention from e.g. a processor at the storage 18.

The scheme of de-queuing packets is as that described above for storing packets in the storage 18:

Data packets from a number of queues in the storage 18 may be output via the same adapter 12. These may be arbitrated using any desired scheme, such as round robin, priority or any other prioritization. In the adapter 12, any number of Tx ports or FIFOs may be provided for different flows, queues, priorities or the like, and packets from these may be output via a single PHY or via different PHYs.

In one situation, read/write pointers of a queue are stored in the storage 18 as is the case when storing data in the storage 18. In the same manner, the adapter 12 may mirror the read/write pointers and keep de-queuing data from the queue as long as data seems to be present. Mirroring may, as described above, take place at fixed maximum time intervals, when a queue seems to be too full or too empty, or the like.

The processes/processor may keep track of the Read and Write pointers and, as described above, determine whether the adapter 12 is so busy that data packets for the pertaining queue(s) should be forwarded to another queue and another adapter 12.

In another situation, a processor or process may define which data packets or addresses should be output via an adapter 12 and may forward an indication of such addresses to the adapter 12.

One manner is for the process or processor to copy such packets into a particular queue de-queued by the adapter using a particular set of read/write pointers updated by the process/processor and which is mirrored on to the adapter 12.

Another manner focuses on not copying data packets. In this situation, the data packets are maintained in the original queue, but another set of read/write pointers may be provided for use with the de-queuing of data packets. In fact, a single additional pointer is required, if the original read/write pointers of the queue are maintained. The additional pointer indicates where, in the queue, the process/processor has come to in the analysis and, thus, which of the addresses between the read and write pointer may be de-queued. This additional pointer is maintained by the processor/process and forwarded to or read by the adapter using e.g. DMA, and the pertaining adapter informs the processor/process or the controlling circuit 16, when an address has been de-queued.

The invention claimed is:

1. An apparatus for receiving and forwarding data packets, the apparatus comprising a controlling unit and a plurality of physically separate data receivers and forwarders each comprising:
   a first receiver configured to receive or access a data packet,
   a first processor configured to determine a point in time of receipt/access of the data packet, the first processor comprising a first clock, the first clock of all processors each processor being synchronized,
   a first output configured to output first information comprising the point in time,
   a second receiver configured to receive an address for storing at least part of the data packet, and
   a second receiver configured to facilitate storage of the at least part of the data packet at the address,
the controlling unit comprising:
   a third receiver configured to receive the first information and derive the point in time of receipt/access of the data packet,
   a second clock synchronized with the first clock of the first processors, and a third processor configured for each piece of first information received, and at a point in time at or after the derived point in time added a predetermined time delay, determine an address for storing the data packet in a queue and return the address to the second receiver of the pertaining data receiver and forwarder.

2. The assembly comprising an apparatus according to claim 1 and a storage comprising a plurality of addresses at which data may be stored, the second processor being configured to store the at least parts of the data packet at the received address in the storage.

3. The assembly according to claim 2, wherein a plurality of queues are defined in the storage as separate groups of addresses, the third processor of the controlling unit being configured to determine, from the first information, a queue to which to add the pertaining data packet, and to select an address from the groups of addresses of the pertaining queue.

4. The assembly according to claim 3, wherein the third processor of the controlling unit is configured to determine an address in the determined queue so that the data packets are stored in the queue in an order of receipt/access.

5. The assembly according to claim 3, the assembly further comprising a reader configured to read or de-queue data from the storage, the reader comprising a second output configured to output second information relating to one or more address (es) of the storage, the data of which has been read/de-queued.

6. The assembly according to claim 4, wherein the controlling unit is configured to hold, for each queue, a write pointer identifying a next address in which to add data and a read pointer identifying a next address to be read/de-queued from the queue, the controlling unit being configured to:
    update the write pointer of the queue to which the determined address relates, when an address is determined,
    update, on the basis of received second information, the read pointer of the queue from which data has been de-queued and
    determine the address also on the basis of the read and write pointers of the queues.

7. The assembly according to claim 5, wherein the controlling unit is configured to, when a fill level of a queue exceeds a predetermined value, instruct the second output to output the second information relating to the addresses at which data has been read.

8. The assembly according to claim 5, wherein the controlling unit is configured to output to the reader information relating to updated write pointers, when an address is determined.

9. The assembly according to claim 5, wherein the second processors are configured to inform the controlling unit when the at least part of the data packet has been stored, and wherein the controlling unit is configured to output to the reader information relating to updated write pointers, when having been informed by the second processors.

10. The assembly according to claim 3, wherein the addresses of the queues of the storage are grouped into groups of predetermined number of physical addresses, the groups being positioned non-consecutively, and wherein the addresses implementing the queues are virtual addresses defined as consecutive addresses, the controlling unit further comprising a converter configured to convert between virtual addresses and physical addresses.

11. A method of operating the apparatus according to claim 1, the method comprising:
    initially, synchronizing a first clock of all first processors, subsequently:
    each data receiver and forwarder:
        receiving or accessing a data packet,
        determining a point in time of receipt/access of the data packet, the determining step comprising receiving the time of receipt from the first clock of the data receiver and forwarder,
        outputting first information comprising the point in time,
        receiving an address for storing at least part of the data packet, and
        facilitating storage of the at least part of the data packet at the address, and the controlling unit:
            receiving the first information and deriving the time of receipt/access of the data packet and
            for each piece of first information received and at a point in time at or after the point in time of receipt/access added a predetermined time delay, determining for storing the data packet in a queue an address and returning the address to the second receiver of the pertaining data receiver and forwarder.

12. The method according to claim 11, wherein the facilitating step comprises storing the at least part of the data packet at the received address in a storage comprising a plurality of addresses at which data may be stored.

13. The method according to claim 12, wherein a plurality of queues are defined in the storage as separate groups of addresses, the determining step comprising determining, from the first information, a queue to which to add the pertaining data packet, and selecting an address from the groups of addresses of the pertaining queue.

14. The method according to claim 13, wherein the step of determining the address comprises determining an address so that, within one or more of the queues, the at least part of the data packets are stored in the order of receipt/access thereof.

15. The method according to claim 12, further comprising the step of reading or de-queuing data from the storage, the reading step comprising outputting second information relating to one or more address(es) of the storage, the data of which has been read/de-queued.

16. The method according to claim 13, wherein the controlling unit holds, for each queue, a write pointer identifying a next address in which to add data and a read pointer identifying a next address to be read/de-queued from the queue, the controlling unit:
    updating the write pointer of the queue to which the determined address relates, when an address is determined,
    updating, on the basis of received second information, the read pointer of the queue from which data has been de-queued and
    determining the address also on the basis of the read and write pointers of the queues.

17. The method according to claim 16, wherein the controlling unit instructs, when a fill level of a queue exceeds a predetermined value, a reader to output the second information relating to the addresses at which data has been read.

18. The method according to claim 15, wherein the determining step comprises outputting to the reader, information relating to updated write pointers.

19. The method according to claim 15, wherein the facilitating step comprises informing the controlling unit when the at least part of the data packet has been stored, and wherein the controlling unit outputs to the reader, information relating to updated write pointers, when having been informed by the second processors.

20. The method according to claim 12, wherein the addresses of the queues of the storage are grouped into groups of predetermined number of physical addresses, the groups being positioned non-consecutively, and wherein the addresses implementing the queues are virtual addresses defined as consecutive addresses, the determining step further comprising converting between virtual addresses and physical addresses.

* * * * *